US008840829B2

(12) United States Patent
Monsheimer et al.

(10) Patent No.: US 8,840,829 B2
(45) Date of Patent: *Sep. 23, 2014

(54) POLYMER POWDER WITH POLYAMIDE, USE IN A SHAPING PROCESS, AND MOLDINGS PRODUCED FROM THIS POLYMER POWDER

(75) Inventors: Sylvia Monsheimer, Haltern am See (DE); Franz-Erich Baumann, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 644 days.

This patent is subject to a terminal disclaimer.

(21) Appl. No.: 11/335,587

(22) Filed: Jan. 20, 2006

(65) Prior Publication Data

US 2006/0202395 A1 Sep. 14, 2006

(30) Foreign Application Priority Data

Jan. 21, 2005 (DE) .................. 10 2005 002 930

(51) Int. Cl.
*H05B 6/00* (2006.01)
*B27N 3/00* (2006.01)
*D04H 1/20* (2006.01)
*B29B 9/00* (2006.01)

(52) U.S. Cl.
USPC ............ 264/460; 264/6; 264/109; 264/112; 264/113; 264/115

(58) Field of Classification Search
USPC ................. 264/460, 6, 109, 112, 113, 115
See application file for complete search history.

(56) References Cited

U.S. PATENT DOCUMENTS

| | | | |
|---|---|---|---|
| 2,907,755 A | 10/1959 | Lautenschlager et al. | |
| 3,674,751 A * | 7/1972 | Kralicek et al. ............ | 528/317 |
| 5,405,936 A | 4/1995 | Mumcu et al. | |
| 5,425,817 A | 6/1995 | Mugge et al. | |
| 5,668,242 A | 9/1997 | Simon et al. | |
| 5,932,687 A | 8/1999 | Baumann et al. | |
| 6,060,550 A | 5/2000 | Simon et al. | |
| 6,136,948 A | 10/2000 | Dickens, Jr. et al. | |
| 6,149,836 A | 11/2000 | Mumcu et al. | |
| 6,300,413 B1 | 10/2001 | Simon et al. | |
| 6,316,537 B1 | 11/2001 | Baumann et al. | |
| 6,335,101 B1 | 1/2002 | Haeger et al. | |
| 6,579,581 B2 | 6/2003 | Bartz et al. | |
| 6,589,606 B2 | 7/2003 | Waterkamp et al. | |
| 6,656,997 B2 | 12/2003 | Baumann et al. | |
| 6,677,015 B2 | 1/2004 | Himmelmann et al. | |
| 6,766,091 B2 | 7/2004 | Beuth et al. | |
| 6,784,227 B2 | 8/2004 | Simon et al. | |
| 6,884,485 B2 | 4/2005 | Baumann et al. | |
| 7,491,792 B2 * | 2/2009 | Monsheimer et al. ........ | 528/480 |
| 8,119,715 B2 | 2/2012 | Monsheimer et al. | |
| 2003/0114636 A1 | 6/2003 | Schiffer et al. | |
| 2003/0124281 A1 | 7/2003 | Ries et al. | |
| 2004/0086735 A1 | 5/2004 | Monsheimer et al. | |
| 2004/0097636 A1 | 5/2004 | Baumann et al. | |
| 2004/0102539 A1 | 5/2004 | Monsheimer et al. | |
| 2004/0106691 A1 | 6/2004 | Monsheimer et al. | |
| 2004/0137228 A1 | 7/2004 | Monsheimer et al. | |
| 2004/0138344 A1 * | 7/2004 | Allen et al. .................. | 523/326 |
| 2004/0138363 A1 | 7/2004 | Baumann et al. | |
| 2004/0140668 A1 | 7/2004 | Monsheimer et al. | |
| 2004/0180980 A1 | 9/2004 | Petter et al. | |
| 2004/0204531 A1 | 10/2004 | Baumann et al. | |
| 2004/0206443 A1 | 10/2004 | Monsheimer et al. | |
| 2004/0232583 A1 | 11/2004 | Monsheimer et al. | |
| 2005/0014842 A1 | 1/2005 | Baumann et al. | |
| 2005/0027047 A1 | 2/2005 | Monsheimer et al. | |
| 2005/0027050 A1 | 2/2005 | Monsheimer et al. | |
| 2005/0038201 A1 | 2/2005 | Wursche et al. | |
| 2006/0244169 A1 | 11/2006 | Monsheimer et al. | |
| 2006/0281873 A1 | 12/2006 | Alting et al. | |
| 2007/0055044 A1 | 3/2007 | Simon et al. | |
| 2007/0104971 A1 | 5/2007 | Wursche et al. | |
| 2007/0166560 A1 | 7/2007 | Wursche et al. | |
| 2007/0260014 A1 | 11/2007 | Simon et al. | |
| 2008/0119632 A1 | 5/2008 | Baumann et al. | |
| 2008/0166529 A1 | 7/2008 | Hager et al. | |
| 2008/0213552 A1 | 9/2008 | Hager et al. | |
| 2008/0217821 A1 | 9/2008 | Goring et al. | |

(Continued)

FOREIGN PATENT DOCUMENTS

| | | |
|---|---|---|
| DE | 3441708 A1 | 5/1986 |
| JP | 56-73581 | 6/1981 |
| WO | WO 89/10947 | 11/1989 |

OTHER PUBLICATIONS

U.S. Appl. No. 11/293,360, filed Dec. 5, 2005, Monsheimer, et al.
U.S. Appl. No. 11/241,677, filed Oct. 3, 2005, Monsheimer, et al.
U.S. Appl. No. 11/356,416, filed Feb. 17, 2006, Monsheimer, et al.
U.S. Appl. No. 10/565,779, filed Jan. 25, 2006, Monsheimer et al.
U.S. Appl. No. 11/354,114, filed Feb. 15, 2006, Dowe, et al.
U.S. Appl. No. 11/354,100, filed Feb. 15, 2006, Dowe, et al.
U.S. Appl. No. 11/694,129, filed Mar. 30, 2007, Monsheimer, et al.
U.S. Appl. No. 11/671,820, filed Feb. 6, 2007, Monsheimer, et al.
U.S. Appl. No. 12/105,672, filed Apr. 18, 2008, Simon, et al.

(Continued)

*Primary Examiner* — Jeremiah Smith
(74) *Attorney, Agent, or Firm* — Oblon, Spivak, McClelland, Maier & Neustadt, L.L.P.

(57) ABSTRACT

The present invention relates to a polymer powder which comprises polyamide, and to the use of this powder for shaping processes, and also to moldings produced from this polymer powder. The shaping processes are layer-by-layer processes which use powders, where regions of the respective layer are selectively melted via introduction of electromagnetic energy. The selectivity may be achieved, with no intention of restricting the invention thereto, be achieved via masks, application of inhibitors, of absorbers, or of susceptors, or via focusing of the energy introduced. After cooling, the regions then solidified can be removed in the form of moldings from the powder bed.

17 Claims, No Drawings

(56) References Cited

U.S. PATENT DOCUMENTS

| | | |
|---|---|---|
| 2008/0242782 A1 | 10/2008 | Hager et al. |
| 2008/0249237 A1 | 10/2008 | Hager et al. |
| 2009/0088508 A1 | 4/2009 | Monsheimer et al. |
| 2011/0130515 A1 | 6/2011 | Monsheimer et al. |
| 2012/0041132 A1 | 2/2012 | Monsheimer et al. |

OTHER PUBLICATIONS

U.S. Appl. No. 11/484,593, filed Jul. 12, 2006, Monsheimer, et al.
U.S. Appl. No. 11/480,459, filed Jul. 5, 2006, Dowe, et al.
U.S. Appl. No. 12/131,425, filed Jun. 2, 2008, Monsheimer, et al.
U.S. Appl. No. 12/089,926, filed Jun. 4, 2008, Haeger, et al.
U.S. Appl. No. 11/816,556, filed Jan. 28, 2008, Wursche, et al.
U.S. Appl. No. 12/192,208, filed Aug. 15, 2008, Goering, et al.
U.S. Appl. No. 10/590,935, filed Aug. 28, 2006, Monsheimer, et al.
U.S. Appl. No. 10/592,952, filed Sep. 15, 2006, Monsheimer, et al.
U.S. Appl. No. 11/561,021, filed Nov. 17, 2006, Simon, et al.
U.S. Appl. No. 11/587,795, filed Oct. 27, 2006, Monsheimer, et al.
U.S. Appl. No. 11/587,758, filed Oct. 27, 2006, Baumann, et al.
U.S. Appl. No. 11/596,365, filed Nov. 14, 2006, Monsheimer, et al.
U.S. Appl. No. 12/989,899, filed Oct. 27, 2010, Wurshche, et al.
U.S. Appl. No. 13/581,085, filed Aug. 24, 2012, Baumann, et al.
U.S. Appl. No. 13/859,896, filed Apr. 10, 2013, Diekmann, et al.

\* cited by examiner

POLYMER POWDER WITH POLYAMIDE, USE IN A SHAPING PROCESS, AND MOLDINGS PRODUCED FROM THIS POLYMER POWDER

CROSS REFERENCE TO RELATED APPLICATIONS

This application is based on and claims the benefit of priority of German Patent Application No. 102005002930.2, filed Jan. 21, 2005, which is hereby incorporated by reference in its entirety.

BACKGROUND OF THE INVENTION

1. Field of the Invention

The invention relates to a polymer powder based on a polyamide involving a medium-sized lactam ring, preferably prepared via polycondensation of enantholactam, caprylolactam, pelargolactam or caprinolactam, to the use of this powder in shaping processes, and also to moldings produced via a layer-by-layer process which selectively melts regions of a pulverulent layer, using this powder.

2. Description of the Background

The rapid production of prototypes is a task often required in very recent times. Particularly suitable processes are those whose operation is based on pulverulent materials, and which produce the desired structures layer-by-layer via selective melting and hardening. Support structures for overhangs and undercuts can be omitted here, because the powder bed surrounding the molten regions provides adequate support. Nor is there any need for subsequent operations to remove supports. These processes are also suitable for short-run production.

The selectivity of the layer-by-layer process may be achieved by way of the application of susceptors, absorbers, inhibitors, or masks, or by way of focused introduction of energy, for example via a laser beam or by way of glass fibers. The introduction of energy is achieved by way of electromagnetic radiation.

Descriptions are given below of some processes which can produce inventive moldings from the powder of the present invention, but there is no intention to restrict the invention thereto.

One process with particularly good suitability for rapid prototyping purposes is selective laser sintering (SLS). This process selectively and briefly irradiates plastics powders in a chamber with a laser beam, the result being that the powder particles impacted by the laser beam melt. The molten particles coalesce and rapidly solidify again to give a solid mass. This process can produce three-dimensional bodies simply and rapidly via repeated irradiation of a succession of freshly applied layers.

The patent specifications U.S. Pat. No. 6,136,948 and WO 96/06881 (both DTM Corporation) give a detailed description of the laser-sintering (rapid prototyping) process for producing moldings from pulverulent polymers. A wide variety of polymers and copolymers is claimed for this application, e.g., polyacetate, polypropylene, polyethylene, ionomers, and polyamide.

Other processes with good suitability are the selective inhibition of bonding (SIB) process described in WO 01/38061, or a process described in EP 1 015 214, published as WO 98/51464. Both processes operate with full-surface infrared heating to melt the powder. The selectivity of melting is achieved in the first process via the application of an inhibitor, and in the second process via a mask. DE 103 11 438, priority application for U.S. patent application Ser. No. 10/799,874, describes another process in which the energy needed for the melting process is introduced via a microwave generator, and the selectivity is achieved via application of a susceptor.

Other suitable processes are those which operate with an absorber, which is either present in the powder or is applied by ink-jet methods, as described in DE 10 2004 012 682.8, published as WO 2005/090055, DE 10 2004 012 683.6, published as WO 2005/090056, and DE 10 2004 020 452.7, published as WO 2005/105412.

For the rapid prototyping or rapid manufacturing processes (RP or RM processes) mentioned use may be made of pulverulent substrates, in particular polymers, preferably selected from polyester, polyvinyl chloride, polyacetal, polypropylene, polyethylene, polystyrene, polycarbonate, poly(N-methylmethacrylimides) (PMMI), polymethyl methacrylate (PMMA), ionomer, polyamide, or a mixture of these.

WO 95/11006 describes a polymer powder suitable for laser sintering and showing no overlap of the melting and recrystallization peak during determination of melting behavior via differential scanning calorimetry at a scanning rate of from 10 to 20° C./min, and having a degree of crystallinity of from 10 to 90%, likewise determined via DSC, and having a number-average molecular weight $M_n$ of from 30 000 to 500 000 and an $M_w/M_n$ quotient in the range from 1 to 5.

DE 197 47 309 describes the use of a nylon-12 powder with an elevated melting point and an increased enthalpy of fusion, obtained via reprecipitation of a polyamide previously prepared via ring-opening and subsequent polycondensation of laurolactam. A disadvantage of this powder is gaseous evolution of residual monomers during the construction process in the rapid prototyping machine, in particular when the construction chamber is maintained at a temperature just below the melting point of the polymer during the entire construction process. Evolution of these gases leads to sublimation on RP machine parts, where they can be very disruptive. By way of example, condensation on the optics in the laser-sintering process leads to altered construction conditions, firstly with regard to laser performance, and also with regard to component precision. Deposits on movable parts, e.g., on the apparatus for powder application, or on the apparatus for distribution of the absorber, inhibitor, or susceptor, likewise leads to poorer process reliability and to less precise results. Particularly in the case of long construction times, this effect can become problematic. In order to reduce the level of this effect, a complicated and expensive intermediate step may be inserted during the preparation of the polyamide powder: extraction of the residual monomers from the polyamide in alcohol. In particular, handling incurs a certain cost when hot alcohol is involved.

SUMMARY OF THE INVENTION

Accordingly, it is the object of the present invention to provide a polymer powder which permits the production of moldings which have maximal dimensional precision and which are produced with good surface quality, using a process which has maximum reproducibility. The intention is that, even without the extraction step in the preparation of the powder, no significant sublimation is to occur in the rapid prototyping machine. The process here is a layer-by-layer process in which regions of the respective pulverulent layer are selectively melted by means of electromagnetic energy and, after cooling, have become bonded to give the desired molding.

Surprisingly, it has now been found that the use of polyamides involving medium-sized lactam rings can, via polycondensation and subsequent precipitative crystallization, prepare polymer powders from which it is possible, via a layer-by-layer process in which regions of the respective pulverulent layer are selectively melted, to produce moldings which have advantages in terms of surface quality and dimensional accuracy, while their properties with regard to consistent processing are better than those obtained from a polymer powder of the prior art, for example, as described in DE 197 47 309.

DETAILED DESCRIPTION OF THE INVENTION

The present invention therefore provides a polymer powder for processing in a layer-by-layer process in which regions of the respective layer are selectively melted, which comprises at least one polyamide prepared via polycondensation of a medium-sized lactam ring, preferably one polyamide prepared via polycondensation of enantholactam, caprylolactam, pelargolactam, or caprinolactam. The residual monomer content here is less than 1%, preferably less than 0.5%, and particularly preferably less than 0.3%, without conduct of any extraction step during the preparation of the polyamide powder.

The inventive polyamide powder here has a melting point of from 190 to 220° C., an enthalpy of fusion of from 50 to 150 J/g, and a recrystallization temperature of from 150 to 200° C.

The BET surface area of the inventive polyamide powder is smaller than 15 m$^2$/g, preferably smaller than 10 m$^2$/g, and particularly preferably smaller than 5 m$^2$/g. The median grain diameter is preferably from 40 to 120 μm, preferably from 45 to 100 μm, and particularly preferably from 50 to 70 μm.

The BET surface area is determined via gas adsorption using the Brunauer, Emmet and Teller principle; the standard utilized is DIN/ISO 9277.

The present invention also provides moldings produced via a layer-by-layer process which selectively melts regions of the respective layer, which comprise at least polyamide prepared from lactams involving medium-sized rings, preferably a polyamide prepared via polycondensation of a lactam from the group of enantholactam, caprylolactam, pelargolactam, or caprinolactam, and, if appropriate, further additives, such as stabilizers, fillers, pigments, flow promoters and powder-flow aids.

An advantage of the inventive polymer powder is that moldings produced therefrom via a layer-by-layer process in which regions of the respective layer are selectively melted have better dimensional accuracy and better surface quality when compared with moldings composed of conventional polyamide powders. This inventive powder has greater processing reliability than conventional polyamide powder.

The mechanical properties of moldings produced from the inventive powder are good and similar to those of the moldings produced from conventional powder.

The inventive polymer powder is described below, but there is no intention to restrict the invention to this description.

The inventive polymer powder for processing in a layer-by-layer process in which regions of the respective layer are selectively melted comprises at least polyamide prepared from lactams involving medium-sized rings, particularly a polyamide prepared via polycondensation of a lactam from the group of enantholactam, caprylolactam, pelargolactam, or caprinolactam.

By way of example, the inventive powder is obtained via a process as in DE 29 06 647 B1 or DE 197 08 146, but preferably using, as starting material, pellets of nylon-7, of nylon-8, of nylon-9, or of nylon-10. The polyamide is dissolved in ethanol and is crystallized under certain conditions. If appropriate, the material is subjected to precautionary sieving and further classification or low-temperature milling. The person skilled in the art can readily establish the conditions via exploratory preliminary experiments.

Inventive polymer powder is also obtained via grinding, preferably at low temperatures. The starting material used preferably comprising pellets of nylon-7, of nylon-8, of nylon-9, or of nylon-10. Post-treatment in a mixer with high shear, preferably at temperatures above the glass transition temperature of the polymer, may also follow in order to round-off the grains and thus improve flowability.

Surprisingly, it has been found that the disadvantages of the previous powders of the prior art, in particular gaseous evolution from the residual monomers during the construction process, can be avoided by using a nylon-7, a nylon-8, a nylon-9, or a nylon-10. This means that the construction process can proceed with markedly more reliability and reproducibility, and it is possible to produce moldings with consistent quality and high surface quality and dimensional precision. Residual monomer content here is less than 1%, preferably less than 0.5%, and particularly preferably less than 0.3%, without conduct of any extraction step during the preparation of the polyamide powder.

The cause of this behavior which is advantageous for the rapid prototyping process is found in the spatial arrangement of the lactams. The materials here are cyclic amides which contain a carbonamide group. The number of CH groups lying between these characterizes the size of the ring and also characterizes the polyamide which is obtained after ring-opening and polycondensation. For example, caprolactam, involving 6 carbon atoms in the ring, forms the basis for a nylon-6, and laurolactam, involving 12 carbon atoms in the lactam ring, forms the basis for nylon-12. Both caprolactam and laurolactam are characterized by relatively stress-free rings. They are therefore relatively stable, and much energy has to be supplied in order, for example, to remove them in the form of residual monomer from the polyamide. An example of a method for this is complicated extraction in alcohol. However, if the lactam rings are of medium size, e.g., specifically in enantholactam, caprylolactam, pelargolactam, or caprinolactam, they are subject to relatively great stress because the CH groups are not spatially displaced in a way that permits a low-stress arrangement. Less energy is to be supplied to cleave these rings and to remove them or to incorporate them into the polyamide chain. A consequence of this is that, even without any additional extraction step, it is then almost impossible to find the corresponding lactams in the nylon-7 or nylon-8 or nylon-9 or nylon-10. References to the phenomenon described can be found by way of example on pages 652 and 653 of Kunststoff Handbuch Polyamide [Plastics handbook, polyamides], 1998, Carl Hanser Verlag, Munich, Vienna, or else in "Thermodynamics of Polymerization" by Bonetskaga, Skuratov et al. Dekker, New York 1970, p. 169.

This inventive polyamide powder has a melting point of from 190 to 220° C., an enthalpy of fusion of from 50 to 150 J/g, and a recrystallization temperature of from 150 to 200° C. The BET surface area of the inventive polyamide powder is smaller than 15 m$^2$/g, preferably smaller than 10 m$^2$/g, and particularly preferably smaller than 5 m$^2$/g. The median grain diameter is preferably from 40 to 120 μm, preferably from 45 to 100 μm, and particularly preferably from 50 to 70 μm.

The various parameters were determined by means of DSC (differential scanning calorimetry) to DIN 53765, or to AN-SAA 0663. The measurements were made using a Perkin Elmer DSC 7 with nitrogen as flushing gas and with a heating rate and cooling rate of 20 K/min. The range of measurement was from −90 to +250° C.

The solution viscosity to DIN EN ISO 307 of the inventive polyamide powders in 0.5% strength m-cresol solution was preferably from 1.4 to 2.1, particularly preferably from 1.5 to 1.9, and very particularly preferably from 1.6 to 1.7. These ranges include all values and subranges therebetween, including 1.5, 1.6, 1.7, 1.9, and 2.

The polyamide may be unregulated, partially regulated, or regulated. The regulation may apply either to the amino end group or to the acid end group, and may be mono-, di- or polyfunctional. Examples of suitable regulators are alcohols, amines, esters, or carboxylic acids. Mono-, di-, or polyamines or -carboxylic acids are used as regulators. Preference is given to the use of an unregulated, partially regulated or amine-regulated material, where, during the construction process, this material brings about good flow of the molten particles, and also good mechanical properties in the finished component.

The starting materials for processing to give inventive powders are marketed, by way of example, by Acros Organic, Belgium. An example of a suitable material for use is caprylolactam.

The inventive polymer powder may also comprise auxiliaries and/or filler and/or other organic or inorganic pigments. Examples of these auxiliaries may be powder-flow aids, e.g., precipitated and/or fumed silicas. Examples of precipitated silicas are marketed with the product name Aerosil with various specifications by Degussa AG. The inventive polymer powder preferably comprises less than 3% by weight, preferably from 0.001 to 2% by weight, and very particularly preferably from 0.05 to 1% by weight, of these auxiliaries, based on the entirety of the polymers present. By way of example, the fillers may be glass particles, metal particles, or ceramic particles, e.g., glass beads, steel shot, or granulated metal, or pigments of other materials, e.g., transition metal oxides. By way of example, the pigments may be titanium dioxide particles based on rutile (preferred) or anatase, or carbon black particles.

The median particle size of the filler particles is preferably smaller than or approximately equal to that of the particles of the polyamides. The amount by which the median particle size $d_{50}$ of the fillers exceeds the median particle size $d_{50}$ of the polyamides is preferably not more than 20%, preferably not more than 15%, and very particularly preferably not more than 5%. A particular limitation on the particle size is the permissible overall height and, respectively, layer thickness in the rapid prototyping/rapid manufacturing system.

Inventive polymer powder preferably comprises less than 75% by weight, preferably from 0.001 to 70% by weight, particularly preferably from 0.05 to 50% by weight, and very particularly preferably from 0.5 to 25% by weight, of these fillers, based on the entirety of polyamides present.

If the stated maximum limits for auxiliaries and/or fillers are exceeded, depending on the filler or auxiliary used, the result can be marked impairment of the mechanical properties of the moldings produced using these polymer powders.

It is also possible to mix conventional polymer powders with inventive polymer powders. This method can produce polymer powders with a different combination of surface properties. The process for preparing these mixtures may be found in DE 34 41 708, for example.

To improve melt flow during the production of the moldings, use may be made of a flow promoter, such as metal soaps, preferably the alkali metal or alkaline earth metal salts of the underlying alkanemonocarboxylic acids or dimer acids, added to the precipitated polyamide powder. The metal soap particles may be incorporated into the polymer particles, or else mixtures of fine metal soap particles and polymer particles may be used.

The amounts used of the metal soaps are from 0.01 to 30% by weight, preferably from 0.5 to 15% by weight, based on the entirety of polyamides present in the powder. These ranges include all values and subranges therebetween, including 0.05, 1, 3, 5, 7.5, 10, 15, 20, 22, 23, 28, and 29.5% by weight. Preferred metal soaps used were the sodium or calcium salts of the underlying alkanemonocarboxylic acids or dimer acids. Examples of commercially available products are Licomont NaV 101 or Licomont CaV 102 from Clariant.

To improve processability, or for further modification of the polymer powder, inorganic pigments composed of other materials, e.g., transition metal oxides, stabilizers, e.g., phenols, in particular sterically hindered phenols, flow promoters and powder-flow aids, e.g., fumed silicas, or else filler particles may be added. The amount of these substances added to the polymers, based on the total weight of polymers in the polymer powder, preferably complies with the stated concentrations for fillers and/or auxiliaries for the inventive polymer powder.

The present invention also provides a process for the production of moldings via layer-by-layer processes in which regions of the respective layer are selectively melted and in which use is made of inventive polymer powders which comprise at least one polyamide prepared from lactams involving a medium-sized ring, preferably at least one nylon-7, one nylon-8, one nylon-9, or one nylon-10.

The energy is introduced via electromagnetic radiation, and the selectivity is achieved, by way of example, via masks, application of inhibitors, of absorbers, or of susceptors, or else via focusing of the radiation, for example via lasers. The electromagnetic radiation encompasses the range from 100 nm to 10 cm, preferably from 400 nm to 10 600 nm or from 800 to 1060 nm. These ranges include all values and subranges therebetween, including 1.5, 1.6, 1.7, 1.9, and 2. The source of the radiation may be, by way of example, a microwave generator, a suitable laser, a radiative heater, or a lamp, or else a combination thereof. Once all of the layers have been cooled, the inventive molding can be removed.

The examples below of these processes serve for illustration, but there is no intention that the invention be restricted thereto.

Laser sintering processes are well-known and are based on the selective sintering of polymer particles, layers of polymer particles being exposed briefly to laser light, thus causing bonding between the polymer particles exposed to the laser light. Three-dimensional objects are produced by sequential sintering of layers of polymer particles. Details concerning the selective laser sintering process are found by way of example in the specifications U.S. Pat. No. 6,136,948 and WO 96/06881.

Other processes with good suitability are the SIB process described in WO 01/38061, or a process described in EP 1 015 214. Both processes operate with full-surface infrared heating to melt the powder. The selectivity of melting is achieved in the first process via the application of an inhibitor, and in the second process via a mask. DE 103 11 438 describes another process. In this, the energy needed for the melting process is introduced via a microwave generator, and the selectivity is achieved via application of a susceptor.

Other suitable processes are those which operate with an absorber, which is either present in the powder or is applied by ink-jet methods, as described in DE 10 2004 012 682.8, DE 10 2004 012 683.6, and DE 10 2004 020 452.7.

The inventive moldings produced via a layer-by-layer process in which regions are selectively melted comprise at least one polyamide prepared from lactams involving a medium-sized ring, preferably prepared via polycondensation of enantholactam, caprylolactam, pelargolactam, or caprinolactam.

The moldings may also comprise fillers and/or auxiliaries (the data for the polymer powder likewise apply here), e.g., heat stabilizers, e.g., sterically hindered phenol derivatives. Examples of fillers may be glass particles, ceramic particles, or else metal particles, e.g., iron shot, or appropriate hollow beads. The inventive moldings preferably comprise glass particles, very particularly preferably glass beads. Inventive moldings preferably comprise less than 3% by weight, particularly preferably from 0.001 to 2% by weight, and very particularly preferably from 0.05 to 1% by weight, of these auxiliaries, based on the entirety of polymers present. Inventive moldings likewise preferably comprise less than 75% by weight, preferably from 0.001 to 70% by weight, particularly preferably from 0.05 to 50% by weight, and very particularly preferably from 0.5 to 25% by weight, of these fillers, based on the entirety of polymers present.

Application sectors for these moldings are found both in rapid prototyping and in rapid manufacturing. The latter always means small runs, i.e. the production of more than one identical part, but a part whose production by means of an injection mold is uneconomic. Examples of these are parts for high-specification cars produced only in small numbers, or replacement parts for motor sports, where availability time is an important factor, alongside the small numbers. Sectors in which the inventive parts are used may be aerospace, medical technology, mechanical engineering, automobile construction, the sports industry, the household goods industry, the electrical industry, and the lifestyle sector.

The examples below are intended to describe the inventive polymer powder and its use, without restricting the invention to the examples.

The laser scattering values measured were obtained using a Malvern Mastersizer S, version 2.18.

Relative solution viscosities were measured on 0.5% strength solutions in m-cresol to ISO 307 or DIN 53727. Low-molecular-weight constituents were determined via extraction of, in each case, 10 g of pellets in 150 ml of abs. ethanol for 4 hours, isolation of the pellets by filtration, and then gravimetric determination of the ethanol filtrate after removal of volatiles.

EXAMPLES

Comparative Example 1

Nylon-12 Pellets 1000 g of laurolactam, 10.5 g of 1,12-dodecanedioic acid, 445 g of water, and 0.1 g of 50% strength aqueous hypophosphorous acid were heated to 280° C. under autogenic pressure (about 22 bar) in a 2 l stirred autoclave composed of V4A steel, and after 5 hours were depressurized to atmospheric pressure within a period of 3 hours. Nitrogen was passed over the melt for a further 2 hours. The reaction product was extruded, pelletized, and dried at 70° C. The following properties were obtained:

| | |
|---|---|
| Relative solution viscosity: | 1.62 |
| Extract content: | 1.26% by weight |
| Melting point (DSC): | 177° C. |
| Enthalpy of fusion: | 77 J/g |
| COOH: | 119 mmol/kg |
| $NH_2$: | 6 mmol/kg |

Inventive Example 1

Nylon-8 Pellets

Using a method similar to that of Comparative Example 1, a mixture composed of 1000 g of caprylolactam, 0.4 g of suberic acid, 440 g of water, and 0.1 g of hypophosphorous acid were reacted to give nylon-8 with the following pellet properties:

| | |
|---|---|
| Relative solution viscosity: | 1.62 |
| Extract content: | 0.46% by weight |
| Melting point (DSC): | 195° C. |
| Enthalpy of fusion: | 68 J/g |
| COOH: | 119 mmol/kg |
| $NH_2$: | 6 mmol/kg |

Comparative Example 2

Reprecipitation of PA 12

400 g of the pellets from Comparative Example 1 were dissolved using 2.6 l of 96% ethanol, denatured with 2-butanone, in a 5 l stirred vessel provided with blade stirrer, at 152° C. with a stirrer rotation rate of 160 rpm, and were kept at this temperature for 75 minutes. Within a period of 40 minutes, the contents of the vessel were cooled to 110° C., and this temperature was maintained for 60 minutes. After about 25 minutes, evolution of heat, discernible from a rise of about 2 K in internal temperature, ceased. The suspension was cooled to 75° C. and transferred to a paddle drier for drying (80° C., 3 hours).

A powder was obtained with the following properties:

| | |
|---|---|
| Bulk density: | 417 g/l |
| Grain size distribution (d10/d50/d90): | 43 μm/66 μm/89 μm |
| Melting point (DSC): | 186° C. |
| Enthalpy of fusion: | 119 J/g |
| BET surface area: | 6.8 $m^2$/g |
| LL content (GC): | 0.28% |

Comparative Example 3

Reprecipitation of Extracted Nylon-12

400 g of the pellets from Comparative Example 1 were heated with 1 l of ethanol in a 2 l three-necked flask for 60 minutes at reflux and the product was isolated by hot filtration. The pellets, still moist with ethanol, were dissolved using 2.6 l of 96% ethanol, denatured with 2-butanone, in a 5 l stirred vessel provided with blade stirrer, at 152° C. with a stirrer rotation rate of 160 rpm, and were kept at this temperature for 75 minutes. Within a period of 40 minutes, the contents of the vessel were cooled to 110° C., and this temperature was maintained for 60 minutes. After about 25 minutes, evolution of heat, discernible from a rise of about 2 K in internal temperature, ceased. The suspension was cooled to 75° C. and transferred to a paddle drier for drying (80° C., 3 hours).

A powder was obtained with the following properties:

| | |
|---|---|
| Bulk density: | 422 g/l |
| Grain size distribution (d10/d50/d90): | 41 μm/68 μm/93 μm |
| Melting point (DSC): | 187° C. |
| Enthalpy of fusion: | 125 J/g |
| BET surface area: | 7.4 m$^2$/g |
| LL content (GC): | 0.14% |

Inventive Example 2

Reprecipitation of Nylon-8

Using a method similar to that of Comparative Example 2, 400 g of the pellets from Inventive Example 1 were reprecipitated, using a solution temperature of 160° C. and a precipitation temperature of 119° C. The following properties were obtained:

| | |
|---|---|
| Bulk density: | 317 g/l |
| Grain size distribution (d10/d50/d90): | 29 μm/69 μm/99 μm |
| Melting point (DSC): | 204° C. |
| Enthalpy of fusion: | 139 J/g |
| BET surface area: | 12.8 m$^2$/g |
| CpL content (GC): | 0.12% |

From the inventive examples it can be very clearly seen that the inventive polyamide powders have markedly reduced residual monomer content when compared with conventional polymer powders. Correspondingly, it is possible to produce components with higher surface quality, because less sublimation on parts of the rapid prototyping machine can give a more reproducible process which can be optimized to the same extent for all components.

Obviously, numerous modifications and variations on the present invention are possible in light of the above teachings. It is, therefore, to be understood that within the scope of the accompanying claims, the invention may be practiced otherwise than as specifically described herein.

What is claimed is:

1. A process for production of moldings via a layer-by-layer process comprising:
   (1) selectively applying at least one component selected from the group consisting of a susceptor, an inhibitor, an absorber, and at least one mask to a respective pulverulent layer which comprises a powder comprising at least one polyamide prepared by a method comprising:
   polycondensation of at least one lactam selected from the group consisting of enantholactam and caprylolactam without conducting an extraction of a residual monomer during the preparation, wherein a content of the residual monomer in the at least one polyamide is less than 1%; and
   (2) melting regions of the selective application from (1) by electromagnetic energy.

2. The process according to claim 1, which comprises polyamide powder which has been obtained via precipitative crystallization.

3. The process according to claim 1, which comprises polyamide powder which has been obtained via grinding.

4. The process according to claim 1, which comprises a polyamide with a solution viscosity of from 1.4 to 2.1.

5. The process according to claim 4, which comprises a polyamide with a solution viscosity of from 1.5 to 1.9.

6. The process according to claim 5, which comprises a polyamide with a solution viscosity of from 1.6 to 1.7.

7. The process according to claim 1, which further comprises auxiliaries and/or filler.

8. The process according to claim 7, which comprises powder-flow aids as the auxiliaries.

9. The process according to claim 7, which comprises glass particles as the filler.

10. The process according to claim 7, which comprises metal soaps as the auxiliaries.

11. The process according to claim 1, which comprises organic and/or inorganic pigments.

12. The process according to claim 11, which comprises carbon black.

13. The process according to claim 11, which comprises titanium dioxide.

14. The process according to claim 1, wherein said lactam is enantholactam.

15. The process according to claim 1, wherein said lactam is caprylolactam.

16. The process according to claim 1, wherein said powder further comprises at least one additional polyamide prepared by polycondensation of a lactam selected from the group consisting of pelargolactam and caprinolactam.

17. A process for production of moldings via a layer-by-layer process comprising:
   (1) polycondensing at least one lactam selected from the group consisting of enantholactam and caprylolactam without conducting an extraction of a residual monomer during the preparation, thereby obtaining at least one polyamide, wherein a content of the residual monomer in the at least one polyamide is less than 1%;
   (2) selectively applying at least one component selected from the group consisting of a susceptor, an inhibitor, an absorber, and at least one mask to a respective pulverulent layer which comprises a powder comprising the at least one polyamide prepared of (1); and
   (3) melting regions of the selective application from (1) by electromagnetic energy.

* * * * *